United States Patent
Mori

(10) Patent No.: US 7,997,524 B2
(45) Date of Patent: Aug. 16, 2011

(54) REEL

(75) Inventor: Yasuhiro Mori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 244 days.

(21) Appl. No.: 12/216,590

(22) Filed: Jul. 8, 2008

(65) Prior Publication Data
US 2009/0050726 A1 Feb. 26, 2009

(30) Foreign Application Priority Data

Aug. 21, 2007 (JP) ................................ 2007-215027

(51) Int. Cl.
*B65H 75/18* (2006.01)
(52) U.S. Cl. ...................................... 242/608.8; 242/348
(58) Field of Classification Search .................. 242/338, 242/338.1, 343, 343.1, 348, 348.2, 322.4, 242/608.8, 608
See application file for complete search history.

(56) References Cited

U.S. PATENT DOCUMENTS

| 6,651,917 B2 * | 11/2003 | Momoi et al. ................. 242/348 |
| 7,562,842 B2 * | 7/2009 | Ishikawa ..................... 242/610.4 |
| 7,568,654 B2 * | 8/2009 | Sumiya et al. ............. 242/608.8 |
| 2005/0194491 A1 * | 9/2005 | Hatano ....................... 242/608.8 |
| 2005/0236512 A1 * | 10/2005 | Hiraguchi .................. 242/608.8 |
| 2005/0263237 A1 * | 12/2005 | Hatano ........................... 156/73.1 |
| 2008/0135664 A1 * | 6/2008 | Hiraguchi et al. ......... 242/348.1 |
| 2009/0218430 A1 * | 9/2009 | Mori ............................. 242/348 |
| 2009/0218431 A1 * | 9/2009 | Mori ............................. 242/348 |
| 2009/0224091 A1 * | 9/2009 | Ishikawa ...................... 242/348 |

FOREIGN PATENT DOCUMENTS

| JP | 2000-173229 A | 6/2000 |
| JP | 2001-118358 | 4/2001 |
| JP | 2005339634 A * | 12/2005 |
| JP | 2006-092611 A | 4/2006 |

* cited by examiner

Primary Examiner — Michael R Mansen
Assistant Examiner — Juan J Campos
(74) Attorney, Agent, or Firm — Jean C. Edwards, Esq.; Edwards Neils PLLC

(57) ABSTRACT

The present invention provides a reel having an engaging portion that can engage accurately with a braking member. A reel 30 has: a hub 32, an extending portion 36 being formed at a peripheral edge of a lower end portion of the hub 32; an upper flange 38 provided integrally at a peripheral edge of an upper end portion of the hub 32 so as to extend outward; and a lower flange 40 having a floor wall 42 to which a reel plate 46 is fixed, the lower flange 40 being welded to the extending portion 36 of the hub 32. In this reel 30, an engaging portion 48 is formed at the lower flange 40, the engaging portion 48 engaging with a braking member 60 that is held so as to be unable to rotate at the case 12 at times of non-use.

8 Claims, 11 Drawing Sheets

REEL

CROSS-REFERENCE TO RELATED APPLICATION

This application claims priority under 35 USC 119 from Japanese Patent Application No. 2007-215027, the disclosure of which is incorporated by reference herein.

BACKGROUND

1. Technical Field

The present invention relates to a reel on which is wound a recording tape, such as a magnetic tape or the like, which is used as a recording/playback medium mainly of computers or the like.

2. Related Art

There have conventionally been known recording tape cartridges in which a recording tape, such as a magnetic tape or the like which is used as a data recording/playback medium (for data backup) of computers or the like, is wound on a reel formed of a synthetic resin, and the reel is singly accommodated within a case. Such a recording tape cartridge is provided with a braking member so that, when the recording tape cartridge is not in use (is not loaded in a drive device), the reel does not rotate inadvertently.

As a braking member provided at a recording tape cartridge, there is known, for example, a structure which is provided within the hub of a reel and cannot rotate relative to a case, and impedes inadvertent rotation of the reel by meshing with an engaging gear formed at the floor wall of the hub (see, for example, Japanese Patent Application Laid-Open (JP-A) No. 2001-118358). Accordingly, a certain level of accuracy is required in order for the braking member to be able to reliably mesh (engage) with the engaging gear (engaging portion).

SUMMARY

The present invention provides a reel having an engaging portion that can accurately engage with a braking member.

A reel of a first aspect relating to the present invention is a reel on which a recording tape is wound and which rotates within a case at times of use, the reel having: a hub shaped as a substantially cylindrical tube, an extending portion that is directed inward being formed at a peripheral edge of a lower end portion of the hub, and the recording tape being wound around an outer peripheral surface of the hub; an upper flange provided integrally at a peripheral edge of an upper end portion of the hub so as to extend outward; and a lower flange having a floor wall to which a reel plate is fixed, the lower flange being welded to the extending portion of the hub with a region where the reel plate exists being a welding region, wherein an engaging portion is formed at the lower flange, the engaging portion engaging with a braking member that is held so as to be unable to rotate at the case at times of non-use.

In a case in which the engaging portion, with which the braking member engages, is provided at the top surface of the extending portion that is formed at the peripheral edge of the lower end portion of the hub so as to be directed inward, and the lower flange is welded to the bottom surface of this extending portion, it is difficult for the accuracy of the engaging portion (mainly, the height thereof from the reel gear) to be uniform due to warping of the welding region or dispersion in the welded amounts thereof.

However, in accordance with the first aspect, the engaging portion is formed at the lower flange, and not at the extending portion. Therefore, warping of the welding region and dispersion in the welded amounts do not affect the engaging portion, and the accuracy of the engaging portion (mainly the height from the reel gear) can be made to be uniform. Namely, because the engaging portion is separate from the welding region, dispersion at the time of welding of the engaging portion, of which dimensional accuracy is required, can be eliminated, and the engaging portion can be made to accurately engage with the braking member.

Further, a reel of a second aspect has the feature that, in the reel of the first aspect, a hole portion, through which the engaging portion is inserted, is formed in the extending portion.

In accordance with the second aspect, because the extending portion can be formed in an annular shape, the strength of the extending portion can be improved.

A reel of a third aspect has the feature that, in the reel of the first or second aspect, a position prescribing portion, that prescribes a heightwise direction and radial direction position of the hub at a time of welding, is formed at the lower flange.

In accordance with the third aspect, the position prescribing portion, that prescribes the heightwise direction and radial direction position of the hub at the time of welding, is formed at the lower flange. Therefore, the hub can be welded accurately with respect to the lower flange.

As described above, in accordance with the present invention, there is provided a reel having an engaging portion that can accurately engage with a braking member.

BRIEF DESCRIPTION OF THE DRAWINGS

An exemplary embodiment of the present invention will be described in detail based on the following figures, wherein.

DETAILED DESCRIPTION

Figure 1A:
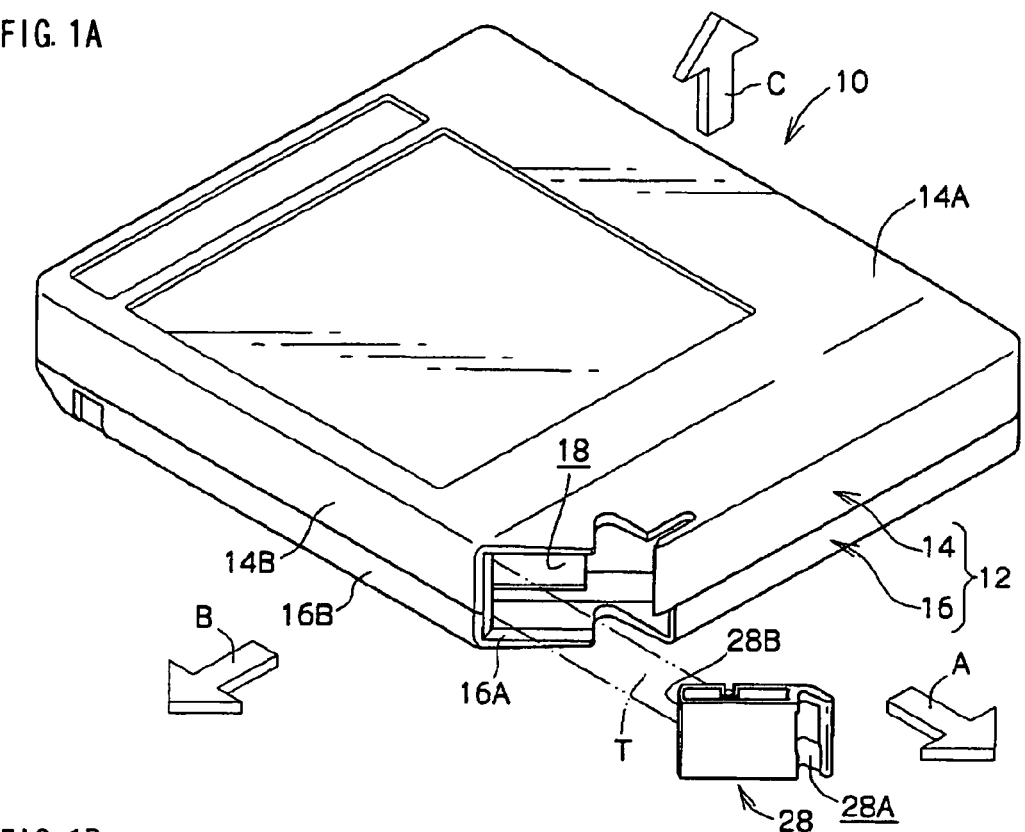
FIG. 1A is a schematic perspective view of a recording tape cartridge seen from above.

Hereinafter, a preferred exemplary embodiment of the present invention will be described in detail on the basis of the example illustrated in the drawings. First, the schematic structure of a recording tape cartridge 10, which is equipped with a reel 30 relating to the present exemplary embodiment, will be described. Note that, for convenience of explanation, in FIG. 1A and FIG. 1B, the direction of loading the recording tape cartridge 10 into a drive device is indicated by arrow A, and this is the forward direction (front side) of the recording tape cartridge 10. A direction orthogonal to the direction of arrow A is indicated by arrow B, and this is the right direction (right side) of the recording tape cartridge 10. Further, the direction orthogonal to the direction of arrow A and the direction of arrow B is indicated by arrow C, and this is the upward direction (upper side) of the recording tape cartridge 10 and the reel 30.

As shown in FIGS. 1A and 1B through FIG. 3, the recording tape cartridge 10 has a case 12 made of resin. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a substantially frame-shaped peripheral wall 16B stands erect along the outer edge of a floor plate 16A which has a configuration substantially corresponding to that of the ceiling plate 14A. The case 12 is formed substantially in the shape of a rectangular box by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into the drive device, the ceiling plate 14A, the peripheral wall 14B, the floor plate 16A, and the peripheral wall 16B are respectively cut-out such that an opening 18, which is inclined with respect to the direction of loading, is formed. Further, a circular gear opening 20 which passes through the floor plate 16A is provided in the substantially central portion of the floor plate 16A, and is for exposing a reel gear 44 which will be described later. At the edge portion of the gear opening 20 at the floor plate 16A, an annular rib 22 projects toward the interior of the case 12, and is for positioning the reel 30 which will be described later and dust-proofing.

A pair of positioning holes 24, 26 open in a vicinity of the front end of the outer surface of the floor plate 16A of the case 12. The pair of positioning holes 24, 26 are provided in the form of pockets within protruding portions (not shown) which stand erect from the floor plate 16A toward the inner side of the case 12. The positioning holes 24, 26 are disposed so as to be spaced apart from one another on an imaginary line in the direction of arrow B.

The positioning hole 24, which is at the side closer to the opening 18, is formed, in bottom view, substantially in the shape of a square that circumscribes a positioning pin (not shown) of the drive device. The positioning hole 26 is formed as a long hole which is long along the aforementioned imaginary line and whose width corresponds to the diameter of a positioning pin. Accordingly, when the recording tape cartridge 10 is loaded into the drive device and positioning pins are inserted into the positioning holes 24, 26 respectively, the recording tape cartridge 10 is positioned accurately in the horizontal direction (the left/right direction and front/back direction) within the drive device.

The portions of the floor plate 16A around the positioning holes 24, 26 are reference surfaces 24A, 26A which are finished so as to be smoother than the other portions (the design surface) of the floor plate 16A. When the positioning pins are inserted into the positioning holes 24, 26, the reference surfaces 24A, 26A abut reference surfaces (not shown) of the drive device which are provided around the positioning pins. In this way, the vertical direction positioning of the recording tape cartridge 10 within the drive device is carried out.

Figure 1B:
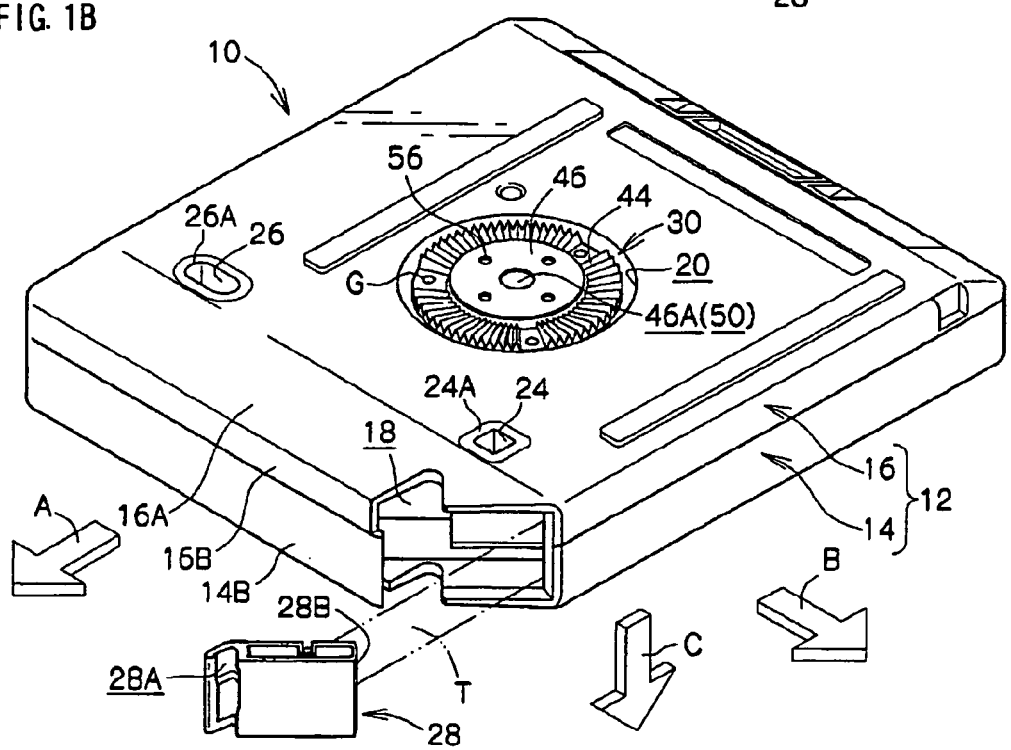
FIG. 1B is a schematic perspective view of the recording tape cartridge seen from below.
Figure 2:
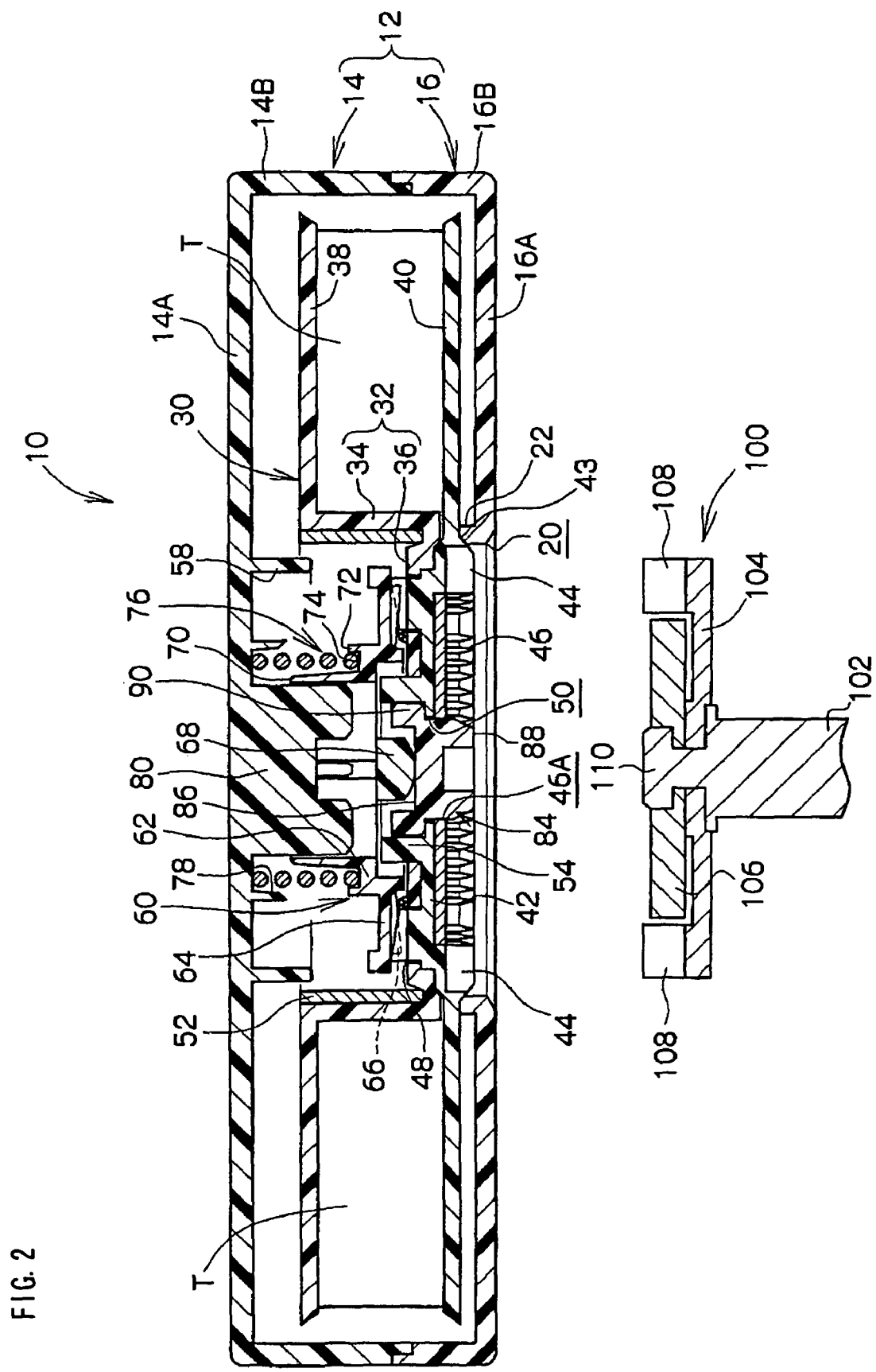
FIG. 2 is a schematic sectional view at a time when a reel of the recording tape cartridge is at a rotation locked position.
Figure 3:
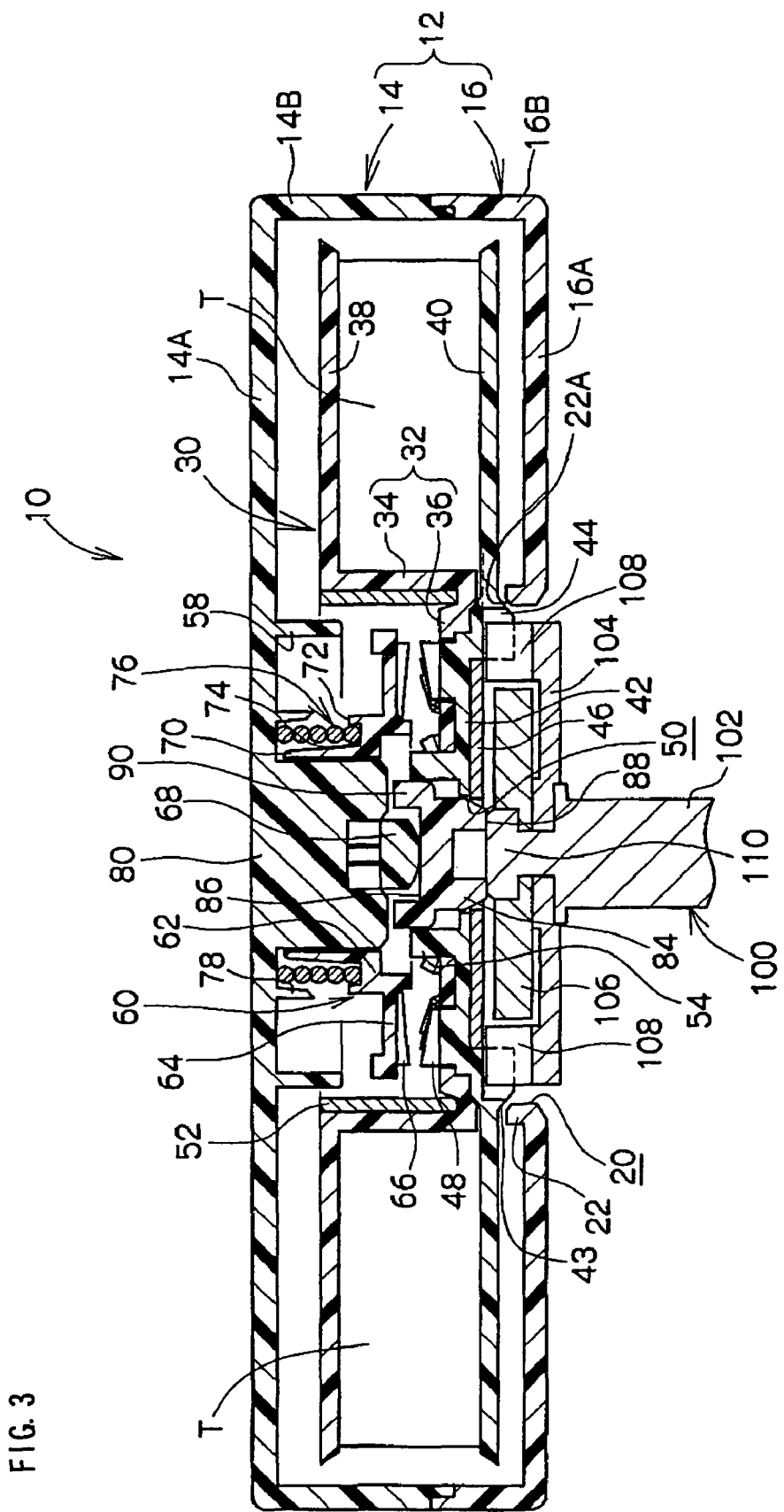
FIG. 3 is a schematic sectional view at a time when the reel of the recording tape cartridge is at a rotation permitted position.

As shown in FIG. 2 and FIG. 3, only one of the resin reel 30 (details thereof will be described later) is rotatably accommodated in the case 12. A recording tape T, such as a magnetic tape or the like, is wound on the reel 30. As shown in FIG. 1A and FIG. 1B, a leader block 28 serving as a leader member is mounted to the distal end of the recording tape T. When the recording tape cartridge 10 is not being used, the leader block 28 is accommodated and held at the inner side of the opening 18 of the case 12. In this state, the leader block 28 closes-off the opening 18 and impedes entry of dust and the like into the case 12.

An engaging recess 28A is formed in the distal end of the leader block 28. When the recording tape T is to be pulled-out within the drive device, the leader block 28 is pulled-out from the case 12 by a pull-out portion (not shown) which engages with the engaging recess 28A, and is guided to a take-up reel (not shown) of the drive device. Moreover, the end surface of the leader block 28 at the side opposite the engaging recess 28A is an arc-shaped surface 28B. By being fit-into the reel hub of the take-up reel, the arc-shaped surface 28B forms a portion of the take-up surface on which the recording tape T is taken-up.

Figure 4:
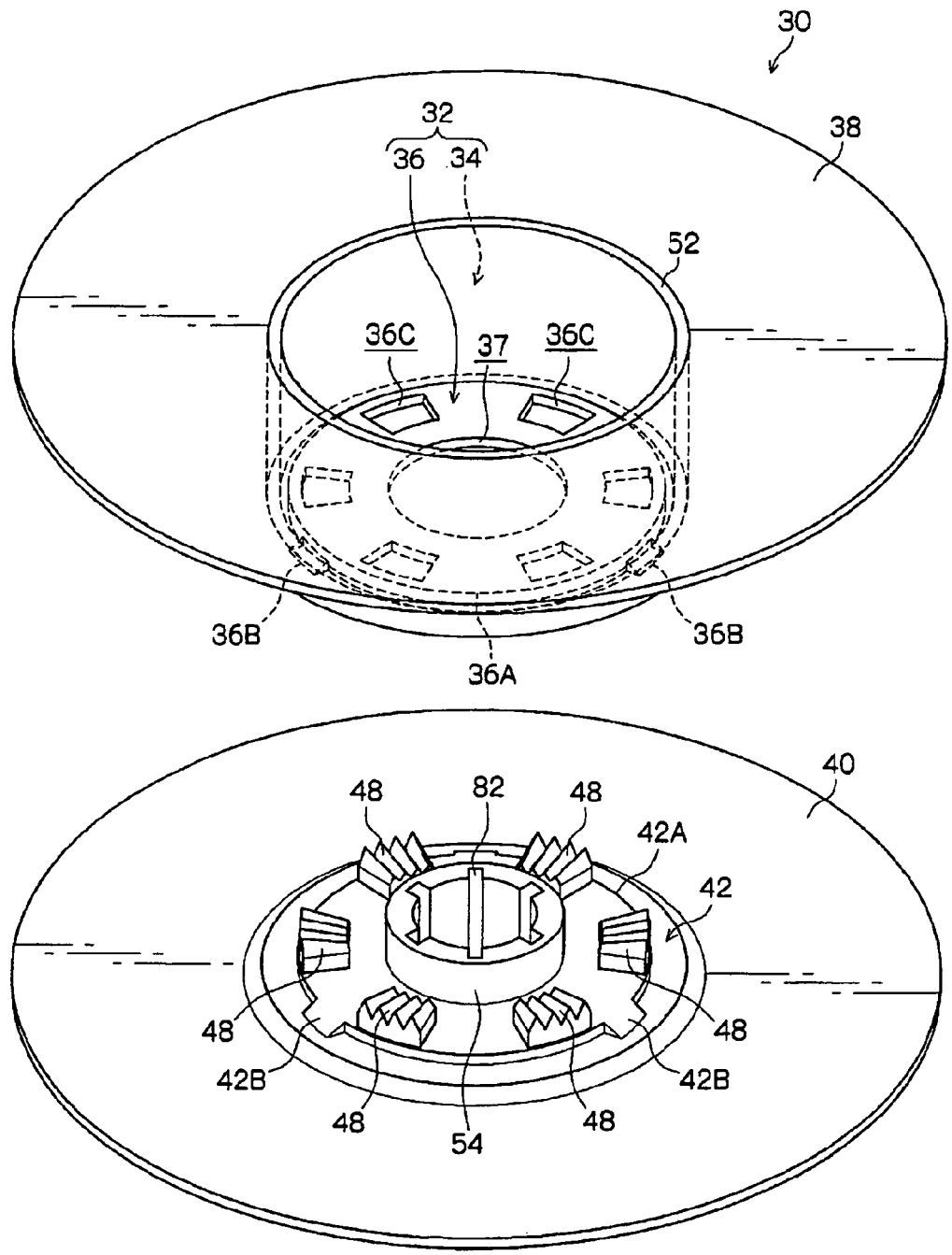
FIG. 4 is a schematic exploded perspective view of the reel seen from above.
Figure 5:
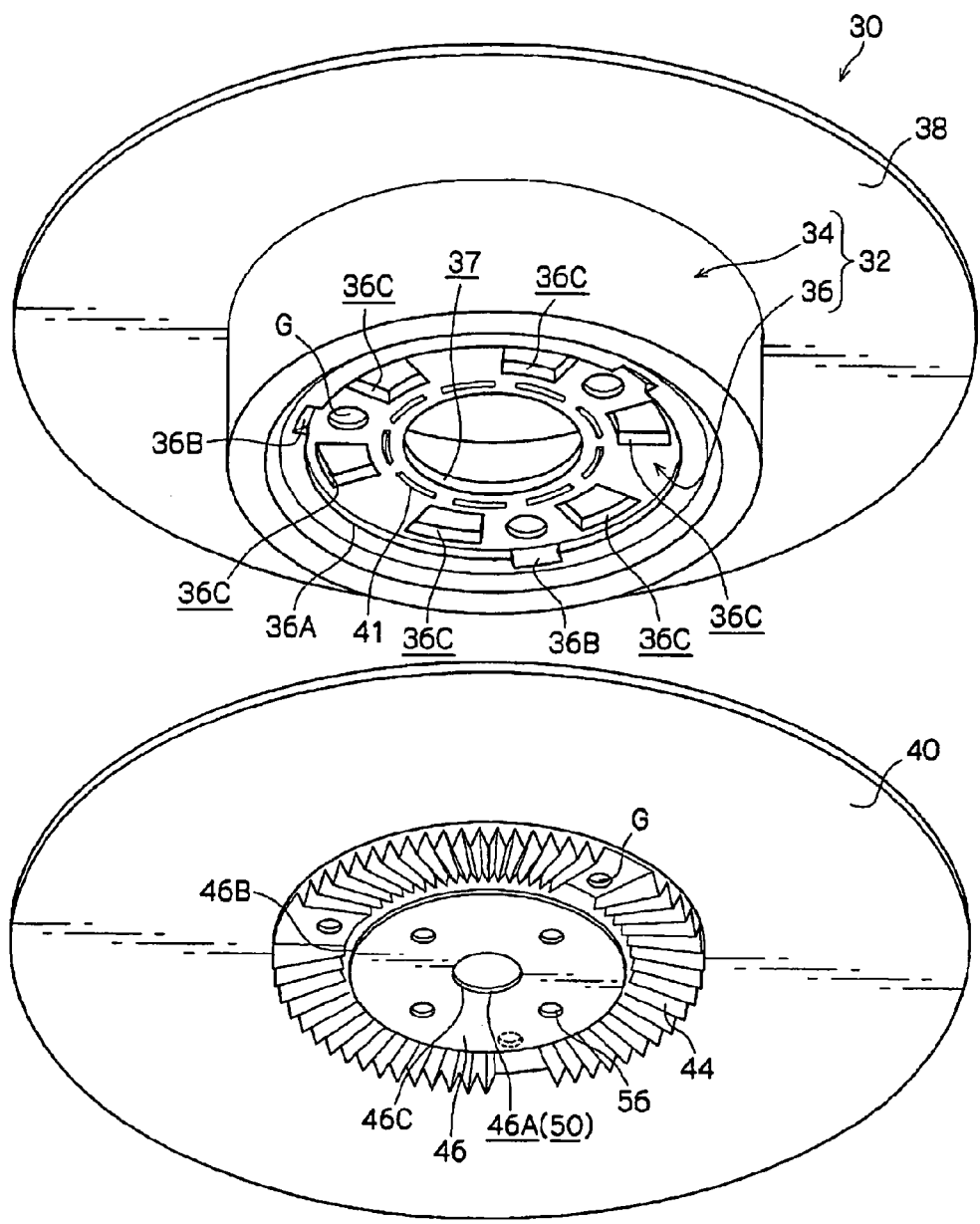
FIG. 5 is a schematic exploded perspective view of the reel seen from below.
Figure 6:
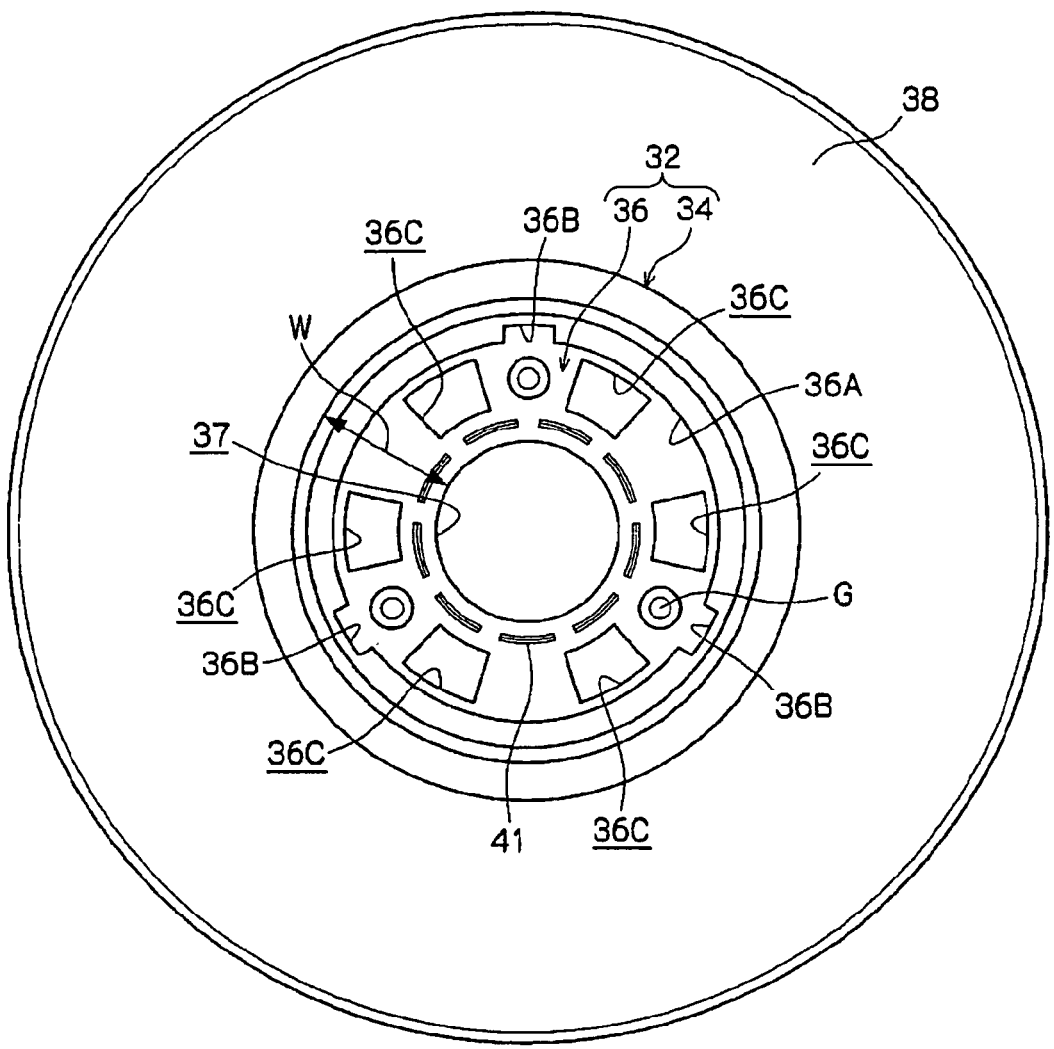
FIG. 6 is a schematic bottom view of an upper flange and a reel hub.

Next, the reel 30 and a braking portion, which impedes rotation of the reel 30 when the reel 30 is not in use, will be described. As shown in FIG. 4 through FIG. 6 and in FIG. 9 through FIG. 11, the reel 30 has a substantially cylindrical-tube-shaped reel hub 32 that structures the axially central portion thereof. The reel hub 32 has a cylindrical tube portion 34 and an annular extending portion 36. The cylindrical tube portion 34 has a predetermined thickness, and the recording tape T is wound around the outer peripheral surface thereof. The annular extending portion 36 (a floor wall that has a pass-through hole 37 at the center thereof) extends in an annular shape integrally from the inner peripheral edge portion at the bottom end portion of the cylindrical tube portion 34, by a predetermined width toward the center of the reel hub 32 (inwardly in the radial direction).

Namely, the pass-through hole 37, through which is inserted a boss portion 54 for clutching (to be described later) that is formed at a lower flange 40, is formed in the center of the floor wall of the reel hub 32. A width W (see FIG. 6) of the annular extending portion 36 is a size equal to the inner diameter of the reel hub 32 (the cylindrical tube portion 34) minus the outer diameter of the boss portion 54 for clutching. Further, the width W of the annular extending portion 36, which is the floor wall of the reel hub 32, is of an extent such that plural (six in the illustrated structure) pass-through holes (hole portions) 36C, through which engaging gears 48 (to be described later) formed at the lower flange 40 are inserted, can be formed with leeway.

A concave step portion 36A, which is substantially annular and is fit-together with and abutted by a convex step portion 42A (to be described later) that is substantially annular and is formed at the lower flange 40, is formed at a predetermined depth at the bottom surface side of the annular extending portion 36, at the outer peripheral edge portion side (the inner peripheral edge portion side of the cylindrical tube portion 34) which is further toward the radial direction outer side than the pass-through holes 36C. Accordingly, the radial direction inner side portion, in which the pass-through holes 36C are formed, of the annular extending portion 36 (i.e., the portion at the side near to the center of the reel hub 32) is formed in a shape that swells upwardly in a planar shape.

Plural (three in the illustrated structure) concave portions 36B, which are substantially rectangular in bottom view, are formed in the radial direction outer side of the concave step portion 36A so as to be separated at predetermined intervals (uniform intervals). Gate marks G, which are injection openings for a resin material for molding, are formed at portions of the annular extending portion 36 between the pass-through holes 36C in the peripheral direction, at the radial direction inner sides of the concave portions 36B.

An upper flange 38 is provided at the peripheral edge of the upper end portion of the reel hub 32 so as to extend integrally and coaxially toward the radial direction outer side. Namely, the reel hub 32 and the upper flange 38 are molded integrally of a resin material for molding. A tubular member (hereinafter called "metal ring") 52 formed of metal, e.g., aluminum, is fixed by insert molding to the inner peripheral surface of the reel hub 32. Note that the height of the metal ring 52 is substantially the same as the height of the reel hub 32.

On the other hand, the lower flange 40 is joined (welded) to the lower end portion (the annular extending portion 36) of the reel hub 32. As shown in FIG. 4, FIG. 5 and FIG. 7 through FIG. 11, the outer diameter of the lower flange 40 is the same as the outer diameter of the upper flange 38. A floor wall 42, to whose bottom surface is fixed a reel plate 46 that will be described later, is formed at the axially central portion of the lower flange 40. The convex step portion 42A, that is substantially annular and serves as a position prescribing portion and fits-together with and abuts the substantially annular concave step portion 36A, is formed at a predetermined height at the top surface of the floor wall 42 at the outer peripheral edge portion side which is further toward the radial direction outer side than the engaging gears 48.

Due to the concave step portion 36A fitting with and abutting the convex step portion 42A, the heightwise direction (vertical direction) and radial direction position of the reel hub 32 with respect to the lower flange 40 is prescribed accurately. Namely, the reel hub 32 can be positioned accurately (coaxially) with respect to the lower flange 40 (the reel gear 44 which will be described later), due to the bottom surface and the inner peripheral surface at the concave step portion 36A fitting together with and abutting the top surface and the outer peripheral surface at the convex step portion 42A, respectively.

Further, plural (three in the illustrated structure) convex portions 42B, that are substantially rectangular in plan view and fit-together with the concave portions 36B, are formed so as to be separated at predetermined intervals (uniform intervals) at the radial direction outer side of the convex step portion 42A, so as to project-out toward the radial direction outer side thereof. There is thereby a structure in which rotation of the reel hub 32 with respect to the lower flange 40 is impeded (a structure in which the peripheral direction position of the reel hub 32 with respect to the lower flange 40 is prescribed). Note that rotation of the reel hub 32 with respect to the lower flange 40 is impeded (the peripheral direction position of the reel hub 32 is prescribed) also by the engaging gears 48 being inserted through the pass-through holes 36C, and therefore, the concave portions 36B and convex portions 42B are not absolutely necessary.

The prescribing of the heightwise direction (vertical direction) and radial direction position (i.e., the positioning) of the reel hub 32 with respect to the lower flange 40 is carried out by the concave step portion 36A except for the concave portions 36B and the convex step portion 42A except for the convex portions 42B. However, the concave step portion 36A and the convex step portion 42A do not have to be substantially annular as illustrated. Namely, the concave step portion 36A and the convex step portion 42A may be formed in even more intermittent substantially annular shapes which also have disconnected portions in addition to the concave portions 36B and the convex portions 42B.

Further, as shown in FIG. 5 through FIG. 11, plural (nine in the illustrated structure) energy directors (hereinafter called "EDs") 41, which are ribs for ultrasonic welding, project-out so as to be separated at predetermined intervals (uniform intervals) in an annular form at predetermined positions of the bottom surface of the annular extending portion 36 (between the pass-through hole 37 and the pass-through holes 36C in the radial direction), which predetermined positions are within a region where the reel plate 46 which will be described later exists (between an outer peripheral edge portion 46B and an inner peripheral edge portion 46C of the reel plate 46) and overlap a region (a flat region) other than small holes 56 that will be described later.

Due to the EDs 41 being fused by ultrasonic waves, the top surface of the floor wall 42 of the lower flange 40 is welded to the bottom surface of the annular extending portion 36 of the reel hub 32. The recording tape T can be wound on the outer peripheral surface of the reel hub 32 (the cylindrical tube portion 34) between the opposing surfaces of the upper flange 38 and the lower flange 40.

At the time of this welding, the convex step portion 42A fits together with and abuts the concave step portion 36A, but the bottom end portion of the reel hub 32 (the cylindrical tube portion 34) does not abut the top surface of the lower flange 40 (a slight clearance K (see FIG. 11) is formed between the bottom end portion of the reel hub 32 and the top surface of the lower flange 40). Due thereto, there is a structure in which it is possible for vibrations from the reel hub 32 at the time the reel 30 rotates to not be transmitted to the lower flange 40.

Figure 8:
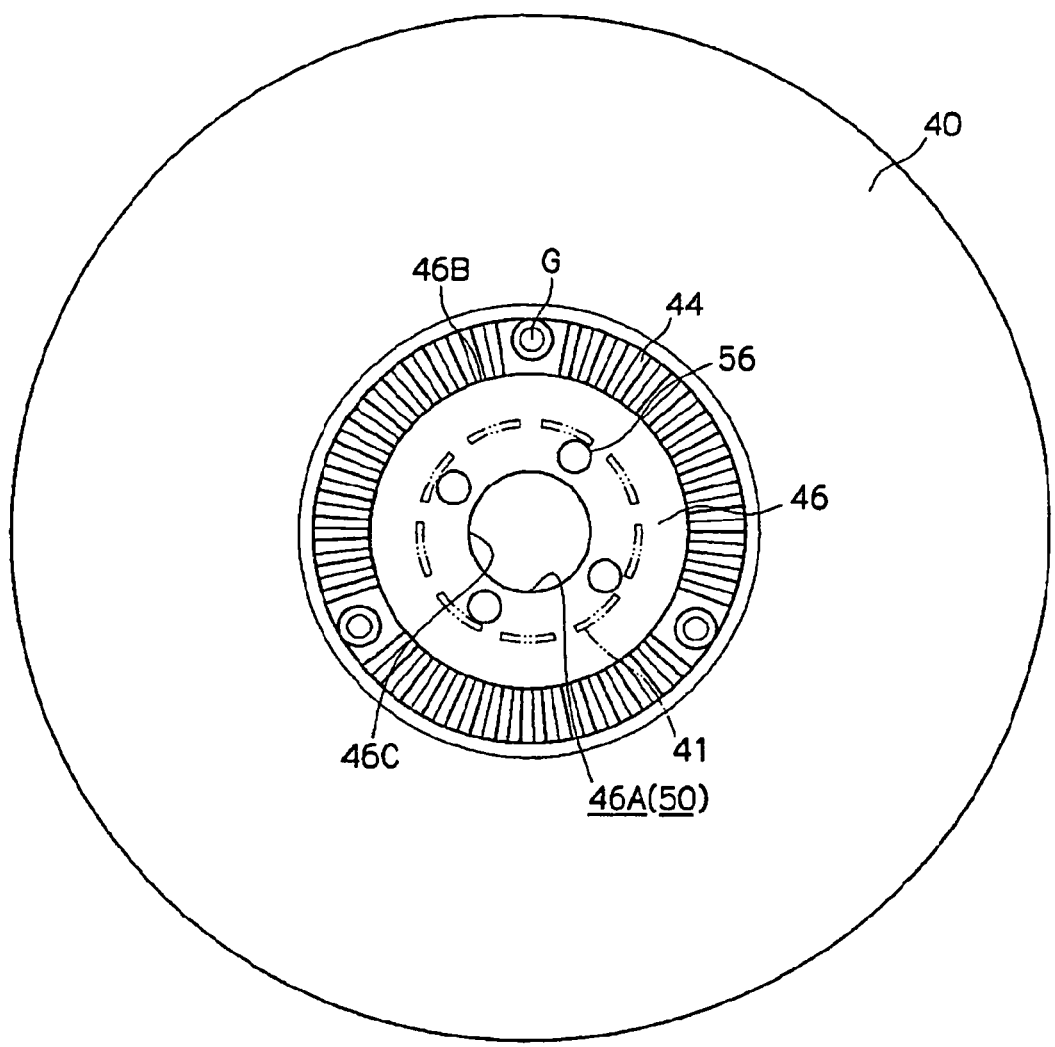
FIG. 8 is a schematic bottom view of the lower flange.

Further, as shown in FIG. 8, the reel gear 44, which is formed in an annular shape which is coaxial with the reel hub 32 at the time when the lower flange 40 is joined to the reel hub 32, is formed at the bottom surface (outer surface) of the floor wall 42 at the lower flange 40. The reel gear 44 can mesh-together with a driving gear 108 which is provided at the distal end of a rotating shaft 100 of the drive device shown in FIG. 2 and FIG. 3.

The tooth tops of the reel gear 44 project-out further downward than the bottom surface of the lower flange 40, and the tooth bottoms are positioned further upward than the bottom surface of the lower flange 40. The radial direction outer end portions of the respective teeth are connected by a taper portion 43 which is continuous with the lower flange 40 from the central portions in the heightwise direction of the teeth to the tooth bottoms thereof. Note that a plurality (three in the illustrated structure) of the gate marks G, which are injection openings for a resin material for molding, are formed so as to be separated from one another at predetermined intervals (uniform intervals) at predetermined positions of the reel gear 44.

The reel plate 46, which is an annular metal plate formed of a magnetic material, is fixed coaxially and integrally to the floor wall 42 of the lower flange 40 by insert molding, at the radial direction inner side of the reel gear 44. The plural (four in the illustrated structure) small holes 56 serving as fixing portions are formed in the reel plate 46 so as to be separated from one another at predetermined intervals (uniform intervals) in the peripheral direction. Step portions 57, at which the diameter of the lower side opening thereof is greater than the diameter of the upper side opening thereof, are formed at the inner peripheral surfaces of the small holes 56 (see FIGS. 9 through 11). Accordingly, after the reel plate 46 is set within an unillustrated mold, the resin material for molding enters into the small holes 56 and flows around to the bottom surfaces of the step portions 57 and hardens. The reel plate 46 is thereby fixed to the floor wall 42.

Figure 9:
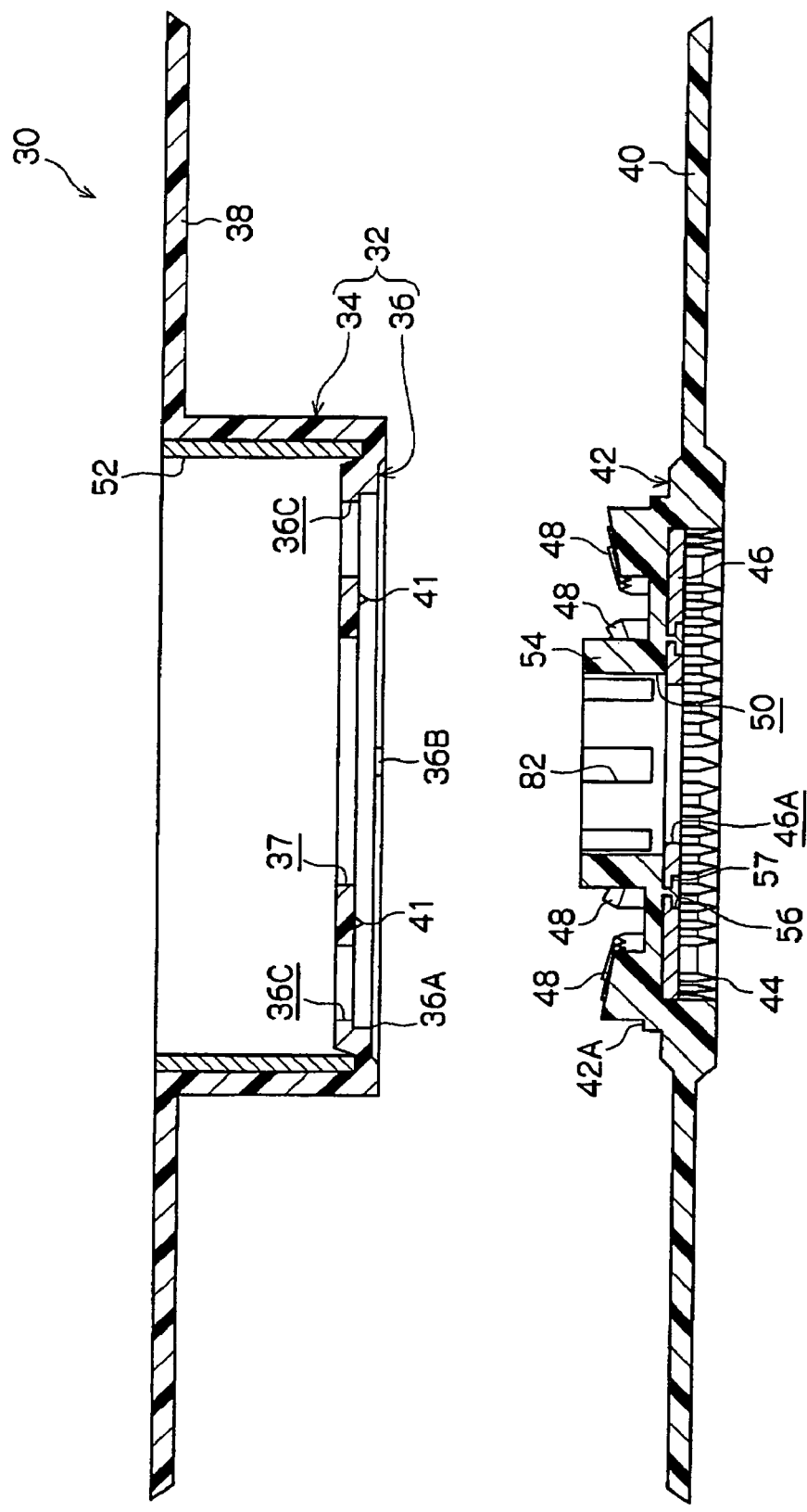
FIG. 9 is a schematic exploded sectional view of the reel.
Figure 10:
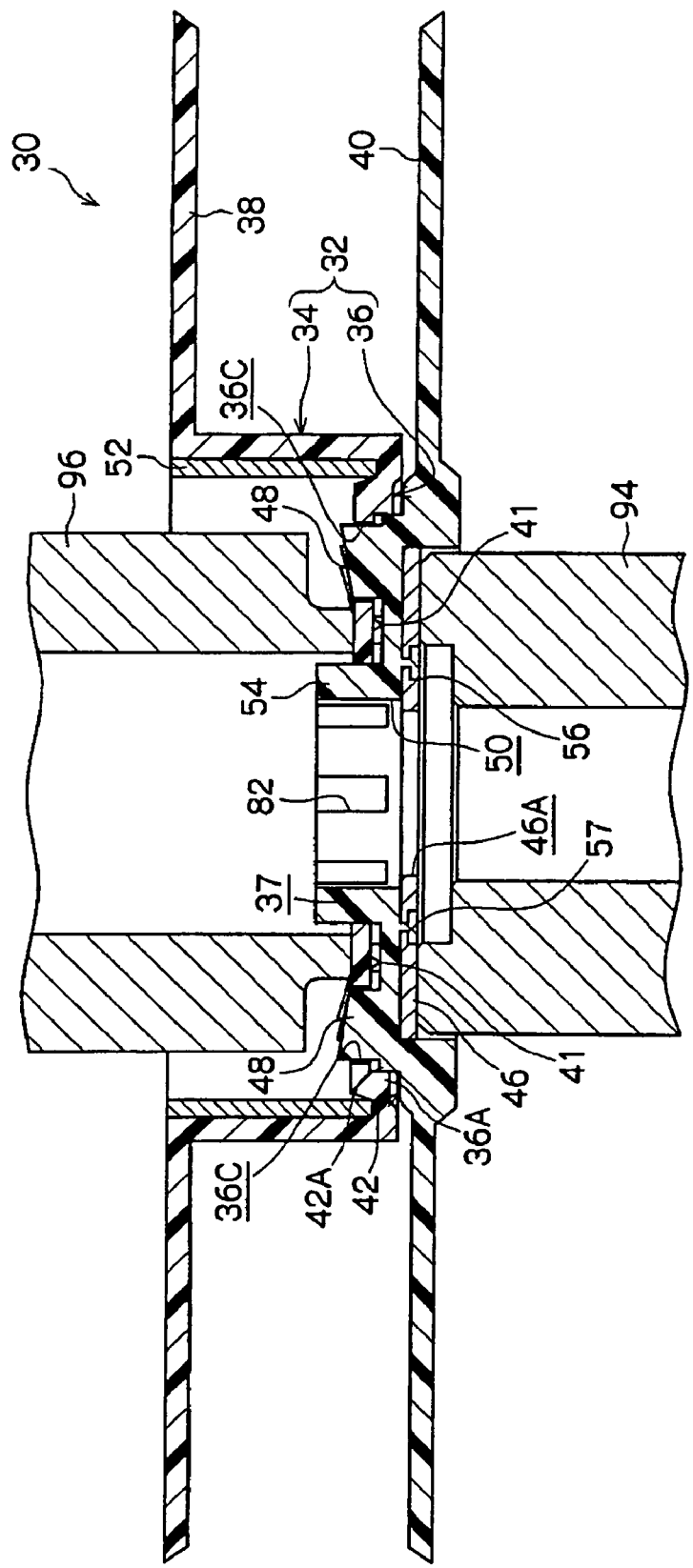
FIG. 10 is a schematic sectional view showing a state in which the lower flange is welded to the reel hub.
Figure 11:
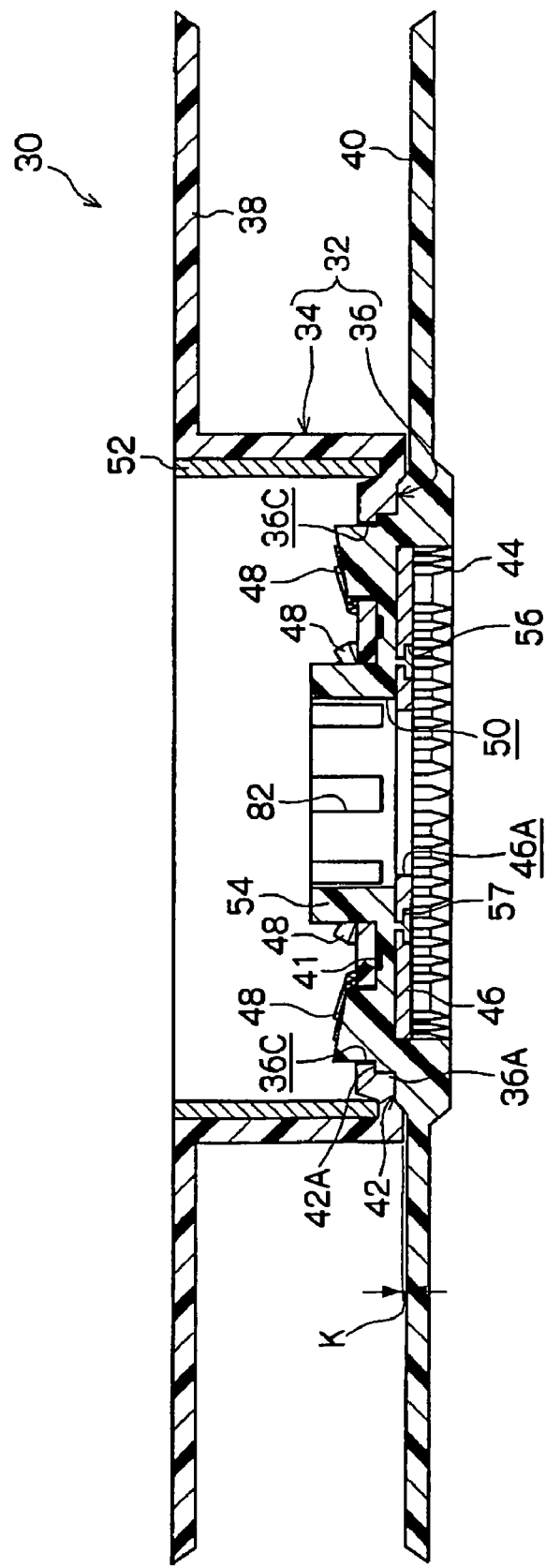
FIG. 11 is a schematic sectional view of the reel.

A pass-through hole 50, through which a clutch member 84 which will be described later is inserted, is formed in the center (the axially central portion) of the floor wall 42 at the lower flange 40. The boss portion 54 for clutching, which is shaped as a short cylindrical tube and serves as a guide wall portion, stands erect upwardly along the edge portion of the pass-through hole 50. The boss portion 54 for clutching will be described together with the clutch member 84 which will be described later. Note that the axially central portion of the reel plate 46 is a through-hole 46A. As shown in FIG. 9 through FIG. 11, the inner diameter of the through-hole 46A is formed to be slightly smaller than the inner diameter of the pass-through hole 50.

As shown in FIG. 4 through FIG. 8, the plural (six in the illustrated structure) engaging gears 48, which are coaxial with the reel hub 32 and are divided into sections, are formed so as to project from the floor wall 42 further at the radial direction inner side than the convex step portion 42A of the lower flange 40, so as to be separated from one another at predetermined intervals (uniform intervals). The plural (six in the illustrated structure) pass-through holes 36C, through which the respective engaging gears 48 are inserted, are formed so as to be separated at predetermined intervals (uniform intervals) at the annular extending portion 36 of the reel hub 32. The engaging gears 48 can mesh with a braking gear 66 of a braking member 60 that will be described later.

As shown in FIG. 2 and FIG. 3, the reel 30 is accommodated in the case 12 and is placed on the annular rib 22 when not in use. Specifically, radial direction movement of the reel 30 is restricted due to the outer side portion of the taper portion 43 at the floor wall 42 abutting the top end surface of the annular rib 22, and the inner edge portion of the upper end of the annular rib 22 being made to be a taper surface 22A which corresponds to the taper portion 43. This is a structure that prevents entry of dust and the like therefrom.

In this state, the reel 30 overall is positioned within the case 12, and the reel gear 44 and the reel plate 46 are exposed from the gear opening 20 (see FIG. 1B). Namely, the reel gear 44 does not project-out from the outer surface (bottom surface) of the floor plate 16A, and faces out onto the exterior of the case 12 from the gear opening 20. Further, the pass-through hole 50 faces out onto the gear opening 20 through the through-hole 46A of the reel plate 46.

In this way, operation of the reel 30, i.e., chucking (holding) and driving/rotating, are possible from the exterior of the case 12. Further, in this state, an annular restricting rib 58, which stands erect from the ceiling plate 14A, is disposed in at the radial direction inner side of the upper end portion side of the reel hub 32 (the cylindrical tube portion 34). The outer peripheral surface of the restricting rib 58 is adjacent to the inner peripheral surface of the reel hub 32 (the cylindrical tube portion 34). The restricting rib 58 thereby suppresses joggling of the reel 30 within the case 12.

Further, the recording tape cartridge 10 has the braking member 60 which serves as a braking portion which impedes rotation of the reel 30 at times of non-use. The braking member 60 has a base portion 62. The base portion 62 is formed substantially in the shape of a cylindrical tube having a floor which opens downward. A flat plate portion 64, which is formed in an annular shape, extends outwardly in the radial direction over the entire periphery, from the axial direction intermediate portion of the outer peripheral portion of the base portion 62. The braking gear 66 is provided over the entire periphery at the bottom surface of the flat plate portion 64. Namely, the braking gear 66 is formed overall in an annular shape, and can mesh-together with the engaging gears 48 of the reel 30.

A sliding-contact projecting portion 68 projects-out at the axially central portion of the bottom surface of the base portion 62. The distal end portion of the sliding-contact projecting portion 68 is formed to be substantially spherical, and substantially point-contacts the clutch member 84 which will be described later. On the other hand, a cross-shaped projection 70, at whose interior is formed a groove which is substantially cross-shaped as seen in plan view, stands erect at the top surface of the base portion 62. Further, an annular rib 72 stands erect at the top surface of the base portion 62. The top surface of the base portion 62 between the rib 72 and the cross-shaped projection 70 is a spring receiving surface 74 which is abutted by one end portion of a compression coil spring 76 which will be described later.

The braking member 60 that is structured in this way is substantially coaxially inserted within the cylindrical tube portion 34 of the reel hub 32, so as to be movable in the vertical direction (the axial direction of the reel 30). Namely, due to the braking member 60 moving in the vertical direction, the braking member 60 can assume a position (rotation locked position), at which the braking gear 66 thereof meshes-together with the engaging gears 48 of the reel 30, and a position (rotation permitted position) at which this meshing-together is cancelled.

A cross-shaped rib 80, which projects downward from the ceiling plate 14A of the case 12, is disposed within the groove of the cross-shaped projection 70 of the braking member 60. The cross-shaped rib 80 is shaped as a detent in which two thin plate pieces intersect one another orthogonally. Due to the cross-shaped rib 80 engaging with the groove walls of the cross-shaped projection 70, rotation of the braking member 60 with respect to the case 12 is impeded. Accordingly, the braking member 60 can impede rotation of the reel 30 due to the braking gear 66 of the braking member 60 being meshed-together with the engaging gears 48 of the reel 30.

Note that the state in which the cross-shaped rib 80 is disposed within the groove is maintained over the entire vertical direction moving stroke of the braking member 60, and the cross-shaped rib 80 also functions to guide the direction of movement of the braking member 60 in the vertical direction. Further, the compression coil spring 76, which can be interpreted in a broad sense as an urging portion, is disposed between the ceiling plate 14A and the spring receiving surface 74 of the braking member 60. One end portion of the compression coil spring 76 abuts the spring receiving surface 74, and the other end portion thereof abuts the ceiling plate 14A. This other end portion is positioned at the inner side of an annular wall portion 78, which projects-out at the ceiling plate 14A at the outer side of the cross-shaped rib 80, such that the position of this other end portion does not become offset in the radial direction.

Due to the urging force of the compression coil spring 76, the braking member 60 is urged downward, and usually (at times of non-use) causes the braking gear 66 to mesh-together with the engaging gears 48 and prevents inadvertent rotation of the reel 30 (the braking member 60 is positioned at the rotation locked position). Further, due to this urging force, the reel 30, which is meshed-together with the braking member 60 at the engaging gears 48, also is urged downward and abuts the annular rib 22 so as to not joggle within the case 12.

The recording tape cartridge 10 has the clutch member 84 serving as a releasing member which is operated from the exterior when the locked state of the reel 30 by the braking member 60 is to be released. Accompanying the operation of the reel gear 44 meshing-together with the driving gear 108 of the drive device, the clutch member 84 is pushed by a releasing projection 110 of the drive device, which will be described later, so as to move upward, and is disposed between the floor wall 42 of the reel 30 and the braking member 60.

Namely, the clutch member 84 is substantially formed in the shape of a solid cylinder which is inserted through the through-hole 46A and the pass-through hole 50. The outer diameter of the clutch member 84 is formed to be substantially the same as the inner diameter of the through-hole 46A of the reel plate 46, i.e., slightly smaller than the inner diameter of the pass-through hole 50 which coincides with the inner diameter of the boss portion 54 for clutching. Further, the flat top end surface of the axially central portion of the clutch member 84 is a sliding-contact surface 86 which always abuts the sliding-contact projecting portion 68 of the braking member 60. The flat bottom end surface of the clutch member 84, which is around a lightening hole provided so as to open downward, is a pushing/operating surface 88. Accordingly, when the pushing/operating surface 88 of the clutch member 84 is pushed, the clutch member 84 moves upward against the urging force of the compression coil spring 76, and the braking member 60 is moved to the rotation permitted position.

Further, the clutch member 84 has rotation restricting ribs 90 which project-out further outwardly in the radial direction than the outer peripheral surface of the clutch member 84. A plurality (six in the illustrated structure) of the rotation restricting ribs 90 are provided at uniform intervals in the peripheral direction of the clutch member 84, and are disposed radially as seen in plan view. The rotation restricting ribs 90 project-out further upward than the sliding-contact surface 86, so as to be spread over (be continuous with both) the top end surface of the clutch member 84 around the sliding-contact surface 86 and the outer peripheral surface in a vicinity of that top end surface.

The rotation restricting ribs 90 are respectively disposed in rotation restricting grooves 82 (see FIG. 4, FIG. 7, and FIG. 9 through FIG. 11) which are recessed in the inner edge portion of the boss portion 54 for clutching. Namely, a plurality (six in the illustrated structure) of the rotation restricting ribs 82 are provided at uniform intervals in the peripheral direction of the boss portion 54 for clutching, and open upward at the top end of the boss portion 54 for clutching. In this way, the clutch member 84 can move in the vertical direction while, at the rotation restricting ribs 90 thereof, being guided by the rotation restricting grooves 82 of the boss portion 54 for clutching.

The rotation restricting ribs 90 maintain the state of being disposed in the rotation restricting grooves 82 of the boss portion 54 for clutching, also when the clutch member 84 moves upward and positions the braking member 60 at the rotation permitted position. In this way, the clutch member 84 cannot rotate relative to the reel 30, i.e., always rotates integrally with the reel 30. Because the rotation restricting grooves 82 are closed-off at the lower end portion of the boss portion 54 for clutching, the clutch member 84 is prevented from falling-out from the reel hub 32 by the rotation restricting ribs 90 and the rotation restricting grooves 82.

As shown in FIG. 2 and FIG. 3, the rotating shaft 100 of the drive device has a rotating shaft portion 102. A disc-shaped rotating table 104 is provided integrally and coaxially with the top end of the rotating shaft portion 102. The driving gear 108, which can mesh-together with the reel gear 44 of the recording tape cartridge 10, is formed in an annular form at the top surface of and at the outer peripheral edge portion of the rotating table 104. Further, a magnet 106, which is substantially formed in the shape of a disc, is disposed coaxially at the top surface of the rotating table 104, at the radial direction inner side of the driving gear 108. The releasing projection 110, which abuts the pushing/operating surface 88 of the clutch member 84, is formed at the axially central portion of the rotating table 104.

Next, operation of the recording tape cartridge 10 having the braking portion and the reel 30 of the above-described structure will be described. At the recording tape cartridge 10, when the recording tape cartridge 10 is not in use, due to the urging force of the compression coil spring 76, the braking member 60 is positioned at the rotation locked position and causes the braking gear 66 to mesh-together with the engaging gears 48. Therefore, rotation of the reel 30 with respect to the case 12 is impeded. At this time, the reel gear 44 of the reel 30 is exposed from the gear opening 20, and the clutch member 84 is inserted through the pass-through hole 50 and the through-hole 46A and faces out onto the gear opening 20.

On the other hand, when the recording tape T is to be used, the recording tape cartridge 10 is loaded along the direction of arrow A into a bucket (not shown) of the drive device. Then, when the recording tape cartridge 10 is loaded to a predetermined depth in the bucket, the bucket is lowered, and the rotating shaft 100 of the drive device relatively approaches the gear opening 20 of the case 12 (moves upward) and holds the reel 30. Specifically, the rotating shaft 100 causes the driving gear 108 thereof to mesh with the reel gear 44, while attracting and holding the reel plate 46 by the magnet 106 in a non-contact state.

Accompanying the meshing-together of the reel gear 44 and the driving gear 108, i.e., the relative movement of the rotating shaft 100 with respect to the case 12 at the adjacent side to the case 12 along the axial direction, the releasing projection 110 of the rotating shaft 100 abuts the pushing/operating surface 88 of the clutch member 84, and pushes the clutch member 84 upward against the urging force of the compression coil spring 76. In this way, the braking member 60, which is abutting the clutch member 84 at the sliding-contact projecting portion 68, also moves upward, the meshing-together of the braking gear 66 and the engaging gears 48 is released, and the braking member 60 moves to the rotation permitted position relative to the reel 30.

Namely, when the rotating shaft 100 moves upward relatively, the reel 30 is brought upward together with the clutch member 84 and the braking member 60 (with their relative positions remaining unchanged) against the urging force of the compression coil spring 76. The braking member 60 reaches the rotation permitted position (with respect to the case 12), and the lower flange 40 separates from the annular rib 22 (the taper surface 22A). In this way, the reel 30 rises-up within the case 12, and becomes able to rotate in a state of not contacting the inner surfaces of the case 12.

Further, at this time, due to the bucket, i.e., the recording tape cartridge 10, being lowered within the drive device, the positioning pins of the drive device enter into the positioning holes 24, 26 of the case 12 respectively, and the reference surfaces of the drive device abut the reference surfaces 24A, 26A of the case 12. In this way, the recording tape cartridge 10 is positioned in the horizontal direction and in the vertical direction with respect to the drive device. Then, the pull-out portion of the drive device, while engaging with the engaging recess 28A of the leader block 28, takes the leader block 28 out from the case 12 and guides the leader block 28 to the take-up reel of the drive device.

Then, the leader block 28 is fit into the reel hub of the take-up reel, and the arc-shaped surface 28B thereof forms a portion of the take-up surface around which the recording tape T is taken-up. In this state, when the leader block 28 rotates integrally with the take-up reel, the recording tape T is pulled-out from the case 12 through the opening 18, while being taken-up onto the reel hub of the take-up reel. Note that, at this time, the reel 30 of the recording tape cartridge 10 rotates synchronously with the take-up reel due to the rotational force of the rotating shaft 100 which is transmitted by the driving gear 108 which is meshed-together with the reel gear 44.

Then, recording of information onto the recording tape T, or playback of information recorded on the recording tape T, is carried out by recording/playback heads (not shown) which are disposed along a predetermined tape path of the drive device. Note that, at this time, the sliding-contact projecting portion 68 of the braking member 60, which cannot rotate with respect to the case 12, slidingly-contacts the sliding-contact surface 86 of the clutch member 84 which rotates together with the reel 30 with respect to the case 12. Namely, the clutch member 84 is structured such that, in the state in which the reel gear 44 is meshed-together with the driving gear 108, the state of abutment of the clutch member 84 with the releasing projection 110 at the pushing/operating surface 88 thereof is maintained, and the braking member 60 is held at the rotation permitted position.

Then, when the reel 30 rotates, there is no relative rotation between the clutch member 84, which rotates integrally with the reel 30, and the rotating shaft 100, which drives the reel 30, and the pushing/operating surface 88 and the releasing projection 110 do not slidingly-contact one another. The sliding-contact surface 86 of the clutch member 84 and the sliding-contact projecting portion 68 of the braking member 60, which cannot rotate with respect to the case 12, slidingly-contact one another. In this way, because there is no relative rotation between the rotating shaft portion 102 and the clutch member 84, the problem of the releasing projection 110 or the pushing/operating surface 88 becoming worn does not arise.

On the other hand, when the recording of information onto the recording tape T or the playback of information recorded on the recording tape T is finished, the recording tape T is rewound onto the reel 30, and the leader block 28 is held in a vicinity of the opening 18 of the case 12. Then, the bucket in which the recording tape cartridge 10 is loaded rises. Thus, the meshing-together of the reel gear 44 and the driving gear 108 is released, the abutment of the releasing projection 110 and the pushing/operating surface 88 of the clutch member 84 is released, and the clutch member 84 moves downward together with the braking member 60 (with the state of abutment thereof maintained) due to the urging force of the compression coil spring 76.

In this way, the braking gear 66 of the braking member 60 meshes-together with the engaging gears 48, and the braking member 60 returns to the rotation locked position at which the braking member 60 impedes rotation of the reel 30 with respect to the case 12. Further, accompanying the movement of the braking member 60 and the clutch member 84 due to the urging force of the compression coil spring 76, the reel 30 also moves downward. While the lower flange 40 of the reel 30 is made to abut the annular rib 22, the reel gear 44 is returned to its initial state of being exposed from the gear opening 20. In this state, the recording tape cartridge 10 is ejected from the drive device (bucket).

Operation of the reel 30 relating to the present exemplary embodiment will be described in detail next. The reel 30 is structured such that the upper flange 38 and the reel hub 32 are molded integrally, and the lower flange 40 having the floor wall 42 is welded to the reel hub 32 with which the upper flange 38 is molded integrally. Accordingly, the strength of the lower flange 40 is ensured. Further, the reel plate 46 is fixed by insert molding in advance to the bottom surface (outer surface) side of the floor wall 42 of the lower flange 40. Namely, the reel plate 46 is fixed integrally to the bottom surface (outer surface) of the floor wall 42 due to a resin material entering in and hardening within the small holes 56 that have the step portions 57.

At the time of welding the lower flange 40 to the reel hub 32, as shown in FIG. 10, a predetermined region (the flat region) of the reel plate 46 directly beneath the surface of the lower flange 40 to be welded (the surface at which the EDs 41 are not provided, and in this case, the top surface of the floor wall 42 further toward the radial direction inner side than the engaging gears 48), is supported by a receiving stand 94.

Then, while the boss portion 54 for clutching, which projects at the center of the floor wall 42 of the lower flange 40, is inserted through the pass-through hole 37 formed in the center of the floor wall of the reel hub 32 with which the upper flange 38 is molded integrally, and the engaging gears 48 are inserted through the pass-through holes 36C formed in the annular extending portion 36, the concave step portion 36A is fit-together with and made to abut the convex step portion 42A. Further, the concave portions 36B are fit-together with the convex portions 42B respectively, and the EDs 41, that project from the welding surface of the reel hub 32 (the surface at which the EDs 41 are provided, and in this case, the bottom surface of the annular extending portion 36 further toward the radial direction inner side than the pass-through holes 36C), are made to contact the surface of the lower flange 40 to be welded.

Next, a horn 96 is inserted through the interior of the reel hub 32 (the cylindrical tube portion 34) and made to abut the top surface of the annular extending portion 36 further toward the radial direction inner side (the reel 30 central side) than the pass-through holes 36C, and the EDs 41 are fused by ultrasonic waves generated from the horn 96. In this way, the lower flange 40 is welded to the reel hub 32 and the reel 30 is manufactured. When the welding surface of the reel hub 32 is superposed on the surface of the lower flange 40 to be welded, the region where the EDs 41 are provided at the welding surface of the reel hub 32 is within the region where the reel plate 46 exists, and is the region (the flat region) other than the small hole 56 portions which are for fixing the reel plate 46 to the floor wall 42.

Figure 7:
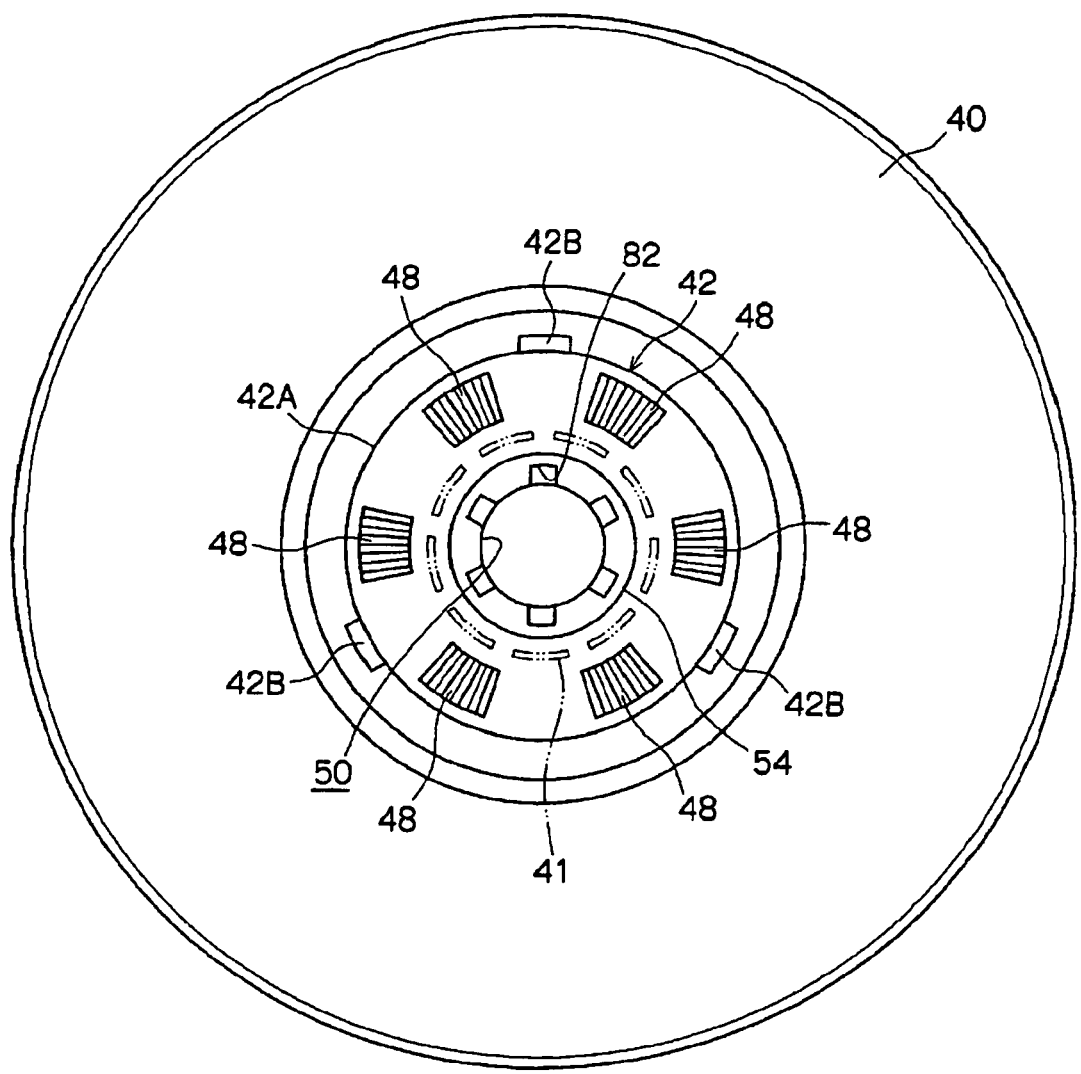
FIG. 7 is a schematic plan view of a lower flange.

Namely, as shown in FIG. 6 through FIG. 8 for example, the region where the EDs 41 are provided is, in plan view or in bottom view, a region that is between the outer peripheral edge portion 46B and the inner peripheral edge portion 46C of the reel plate 46, and between the pass-through holes 36C (the engaging gears 48) and the pass-through hole 37, and further toward the radial direction outer side than the small hole 56 portions. This is because, in a case in which the reel plate 46 is fixed to the bottom surface (outer surface) of the floor wall 42 by insert molding, the resin material, that flows around to and hardens at the bottom surfaces of the step portions 57, projects-out downwardly in convex shapes from the small holes 56.

Namely, this is because, if the region where the EDs 41 are provided is within the region where the reel plate 46 that is fixed to the lower flange 40 exists and is the region other than the small hole 56 portions, the receiving stand 94 can be structured so as to not exist directly beneath these small hole 56 portions (the receiving stand 94 can be structured so as to be able to support only the flat region of the reel plate 46), and the flatness of the lower flange 40 with respect to the receiving stand 94 can be ensured.

Accordingly, even if there are convex portions (the small hole 56 portions) or the like at the surface of the reel plate 46, when the lower flange 40 is set at the receiving stand 94, the problem of the lower flange 40 tilting with respect to the receiving stand 94 does not arise, and the welding accuracy (the accuracy of welding the lower flange 40 with respect to the reel hub 32) at the time of carrying out welding with the welding surface of the reel hub 32 superposed on the surface of the lower flange 40 to be welded, can be improved.

In a case in which the engaging gears 48 are provided at the top surface of the annular extending portion 36 of the reel hub 32 and the lower flange 40 is welded to the bottom surface of the annular extending portion 36, it is difficult to make the accuracy of the engaging gears 48, and, in particular, the heights thereof from the reel gear 44, uniform due to warping of the welding region or dispersion in the welded amounts thereof. Further, if there is a structure in which the metal ring 52 is provided by insert molding at the inner peripheral surface of the reel hub 32, there are cases in which, due to the metal ring 52, differences in contraction arise at the resin material for molding and deformation occurs at the engaging gears 48.

However, in the reel 30 relating to the present exemplary embodiment, the engaging gears 48 are formed at the lower flange 40 and not at the annular extending portion 36. Therefore, warping of the welding region or dispersion in the welded amounts does not affect the engaging gears 48, and the accuracy of the engaging gears 48 (the heights thereof from the reel gear 44) can be made to be uniform. Further, even in a structure in which the metal ring 52 is provided by insert molding at the inner peripheral surface of the reel hub 32, differences in contraction of the resin material for molding due to the metal ring 52 do not affect the engaging gears 48.

Namely, in the reel 30 relating to the present exemplary embodiment, because the engaging gears 48 are separated from the welding region (the welding surface), dispersion at the time of welding of the engaging gears 48, of which dimensional accuracy is required, can be eliminated, and the engaging gears 48 can be made to accurately engage with the braking member 60. Further, because the pass-through holes 36C through which the engaging gears 48 are inserted are formed in the annular extending portion 36 and the extending portion 36 provided at the lower end portion of the reel hub 32 is annular, the problem of the strength of the extending portion 36 deteriorating also does not rise (the strength of the extending portion 36 can be improved).

At the time of welding the reel hub 32 and the lower flange 40, the concave step portion 36A that is formed at the annular extending portion 36 of the reel hub 32 is fit-together with and abuts the convex step portion 42A that is formed at the floor wall 42 of the lower flange 40. Accordingly, the reel hub 32 (including the upper flange 38) can be welded while being positioned (while the position thereof is prescribed) accurately in the heightwise direction (the vertical direction) and the radial direction with respect to the lower flange 40 (including the reel gear 44), and the coaxiality of the reel gear 44 and the reel hub 32 can be ensured well.

At this time, the bottom end portion of the reel hub 32 (the cylindrical tube portion 34) is structured so as to not abut the top surface of the lower flange 40 (the slight clearance K (see FIG. 11) is formed between the bottom end portion of the reel hub 32 and the top surface of the lower flange 40). Accordingly, parallelism of the upper flange 38 and the lower flange 40 after welding can be ensured. Further, because it is possible to make it such that vibrations are not directly transferred from the reel hub 32 to the lower flange 40 at the time when the reel 30 rotates (the transfer of vibrations can be cut-off), the surface run-out width (deformation) of the lower flange 40 can be restrained.

Moreover, there is a structure in which the metal reel plate 46 which has high rigidity is interposed directly beneath the place where the reel hub 32 (the annular extending portion 36) and the lower flange 40 (the floor wall 42) are joined (the welding region). Therefore, deformation of the reel hub 32 due to tight winding of the recording tape T can be suppressed not only by the metal ring 52, but also by the reel plate 46. Accordingly, deformation (flexure) of the upper flange 38 and the lower flange 40 can be suppressed even more.

Namely, if a region within the region where the reel plate 46 exists (i.e., the region between the outer peripheral edge portion 46B and the inner peripheral edge portion 46C of the reel plate 46) is made to be the welding region of the reel hub 32 and the lower flange 40, even in the case of a structure in which the metal ring 52 is not provided, it is possible to prevent occurrence of the problem of the upper flange 38 and the lower flange 40 deforming and contacting the recording tape T due to the tight winding that arises when the recording tape T is wound successively on the reel hub 32.

Note that, in the above-described example, there are six of the engaging gears 48 (pass-through holes 36C). However, the number of the engaging gears 48 (pass-through holes 36C) is not limited to the six that are illustrated. For example, the peripheral direction lengths of the engaging gears 48 (pass-through holes 36C) may be made to be longer than that illustrated, such that three or four of the engaging gears 48 (pass-through holes 36C) are formed at uniform intervals. Moreover, the above example describes the reel 30 that is provided with the clutch member 84, but the same holds for a reel that does not have the clutch member 84 as long as it is a reel in which the engaging gears 48 and the braking member 60 are structured the same as in the above example.

In the above-described example, the EDs 41 are structured so as to project at the annular extending portion 36 of the reel hub 32. However, the EDs 41 may be structured so as to project at the floor wall 42 of the lower flange 40. Moreover, although the illustrated EDs 41 are disposed further toward the radial direction outer side than the small holes 56, the EDs 41 may be disposed at the radial direction inner side of the small holes 56, depending on the positions where the small holes 56 are provided. Namely, the positions of the small holes 56 may be changed appropriately in accordance with the design.

Further, in the above-described example, the leader block 28 is used as the leader member, but the leader member is not limited to the same and may be, for example, a solid-cylindrical leader pin (not shown). In this case, the case 12 may be structured to have a covering member (a sliding door or the like (not shown)) which moves along a predetermined straight line or circular arc) which opens and closes the opening 18. Moreover, it suffices for the recording tape T to be interpreted as an elongated-tape-shaped information recording/playback medium onto which information can be recorded and from which recorded information can be played-back. It goes without saying that the recording tape cartridge 10 (the reel 30) can be applied as well to recording tapes T of any recording/playback systems.

What is claimed is:

1. A reel on which a recording tape is wound and which rotates within a case at times of use, the reel comprising:
    a hub shaped as a substantially cylindrical tube, an extending portion that is directed radially inward being formed at a peripheral edge of a lower end portion of the hub and extending over a reel plate, and the recording tape being wound around an outer peripheral surface of the hub;
    an upper flange provided integrally at a peripheral edge of an upper end portion of the hub so as to extend outward; and a lower flange comprising a floor wall having a bottom surface to which the reel plate is fixed, the lower flange being welded to the extending portion of the hub with welds located within a welding region of the extending portion which is located inward of an outer peripheral edge portion of the reel plate, wherein an engaging portion is formed at the lower flange, the engaging portion engaging with a braking member that is held so as to be unable to rotate at the case at times of non-use;

wherein the engaging portion passes through the extending portion of the hub and faces toward an inner side of the hub; and wherein the extending portion is ring-shaped.

2. The reel of claim 1, wherein a hole portion, through which the engaging portion is inserted, is formed in the extending portion.

3. The reel of claim 2, wherein a position prescribing portion, that prescribes a heightwise direction and radial direction position of the hub at a time of welding, is formed at the lower flange.

4. The reel of claim 3, wherein the position prescribing portion is a substantially annular convex step portion, that is formed at a predetermined height at a top surface of the floor wall of the lower flange at an outer peripheral edge portion side which is further toward a radial direction outer side than the engaging portion, and fits-together with and abuts a substantially annular concave step portion which is formed at a predetermined depth at a bottom surface side of the extending portion.

5. The reel of claim 1, wherein a position prescribing portion, that prescribes a heightwise direction and radial direction position of the hub at a time of welding, is formed at the lower flange.

6. The reel of claim 5, wherein the position prescribing portion is a substantially annular convex step portion, that is formed at a predetermined height at a top surface of the floor wall of the lower flange at an outer peripheral edge portion side which is further toward a radial direction outer side than the engaging portion, and fits-together with and abuts a substantially annular concave step portion which is formed at a predetermined depth at a bottom surface side of the extending portion.

7. The reel of claim 1, wherein, at the time of welding the lower flange to the hub, a slight clearance is formed between a bottom end portion of the hub and a top surface of the lower flange.

8. The reel of claim 1, wherein the welds are formed at energy directors comprising a plurality of ribs for ultrasonic welding.

* * * * *